US007242421B2

(12) United States Patent
Center, Jr. et al.

(10) Patent No.: US 7,242,421 B2
(45) Date of Patent: Jul. 10, 2007

(54) METHODS OF ESTABLISHING A COMMUNICATIONS LINK USING PERCEPTUAL SENSING OF A USER'S PRESENCE

(75) Inventors: Julian L. Center, Jr., Andover, MA (US); Christopher R. Wren, Cambridge, MA (US); Sumit Basu, Cambridge, MA (US); Evgeniy Gusyatin, West Roxbury, MA (US)

(73) Assignee: Perceptive Network Technologies, Inc., Kingston, NH (US)

( * ) Notice: Subject to any disclaimer, the term of this patent is extended or adjusted under 35 U.S.C. 154(b) by 708 days.

(21) Appl. No.: 10/012,097

(22) Filed: Nov. 13, 2001

(65) Prior Publication Data

US 2002/0163572 A1    Nov. 7, 2002

Related U.S. Application Data

(60) Provisional application No. 60/247,143, filed on Nov. 10, 2000.

(51) Int. Cl.
*H04N 7/14* (2006.01)

(52) U.S. Cl. ............... 348/14.1; 379/93.21; 379/93.23; 379/90.01

(58) Field of Classification Search .... 348/14.01–14.1, 348/14.3, 169; 379/93.17, 93.21, 93.23; 709/204; 345/473, 753, 758; 382/291; 700/17; 713/200–202; 340/540–542, 539.22, 539.23; 715/700, 753, 758

See application file for complete search history.

(56) References Cited

U.S. PATENT DOCUMENTS 3,679,295 A * 7/1972 Newman et al. ............ 351/210

5,793,365 A * 8/1998 Tang et al. .................. 345/758
5,892,856 A * 4/1999 Cooper et al. .............. 382/291

(Continued)

OTHER PUBLICATIONS

S. Birchfield. "Elliptical Head Tracking Using Intensity Gradients and Color Histograms," *Proceedings of the IEEE Conference on Computer Vision and Pattern Recognition*, Santa Barbara 1998.

(Continued)

*Primary Examiner*—Melur Ramakrishnaiah
(74) *Attorney, Agent, or Firm*—Milton Oliver, Esq.; Ware Fressola Van Der Sluys & Adolphson LLP

(57) ABSTRACT

A method of establishing a communications link uses automatic sensing of a computer user's presence and activity state to record user attributes in a form accessible to other computers in a communications network. Such automatic sensing may include keyboard/mouse monitors, cameras with associated image processing algorithms, speech detectors, RF radiation detectors, and infrared sensors. Preferably, the attribute recording is done in a server process which can be accessed by other computer programs. A first application of this method is to inform persons at remote locations whether the party to be called is available to receive a call. A second application of the method is to use a Connection Agent to determine whether all desired participants for a conference, or at least a quorum of them, are present and available, so that the conference can be started. A third application of the method is to allow a called party to adjust the kind of notification, if any, he or she receives of an incoming call, depending upon what activity is currently engaging the called party.

2 Claims, 17 Drawing Sheets

Overall Signal Flow for Presence Detection

U.S. PATENT DOCUMENTS

| | | | |
|---|---|---|---|
| 5,903,216 A * | 5/1999 | Sutsos et al. | 340/542 |
| 5,923,737 A * | 7/1999 | Weishut et al. | 379/93.17 |
| 6,256,046 B1 * | 7/2001 | Waters et al. | 345/473 |
| 6,367,020 B1 * | 4/2002 | Klein | 713/202 |
| 6,374,145 B1 * | 4/2002 | Lignoul | 700/17 |
| 6,462,767 B1 * | 10/2002 | Obata et al. | 348/14.08 |
| 6,519,335 B1 * | 2/2003 | Bushnell | 379/215.01 |

OTHER PUBLICATIONS

Grimson, W.E.L., Stauffer, C., Romano, R., Lee, L. "Using Adaptive Tracking To Classify and Monitor Activities In A Site", *Proceedings of the IEEE Conference on Computer Vision and Pattern Recognition*, Santa Barbara, 1998.

N. Oliver, A. Pentland, F. Berard, "LAFTER: Lips and Face Real Time Tracker," *Proceedings of the IEEE Conference on Computer Vision and Pattern Recognition*, 1997.

Y. Raja, S.J. McKenna, S. Gong, "Tracking and Segmenting People in Varying Lighting Conditions Using Colour." *Proceedings of the Int. Conference on Automatic Face and Gesture Recognition*, 1998.

H. Rowley, S. Baluja, and T. Kanade, "Rotation-Invariant Neural Network-Based Face Detection," in *Proceedings of the IEEE Conference on Computer Vision and Pattern Recognition*, Jun. 1998.

Tom Rikert and Mike Jones and Paul Viola, "A Cluster-Based Statistical Model for Object Detection," *Proceedings of the International Conference on Computer Vision*, 1999.

Kah-Kay Sung and Tomaso Poggio, "Example-based Learning for View-based Human Face Detection" AI Memo No. 1521/CBCL Paper 112, Massachusetts Institute of Technology, Cambridge, MA, Dec. 1994.

C. Wren, A. Azarbayejani, T. Darrell, and A. Pentland, "Pfinder: Real-Time Tracking of the Human Body", *IEEE Transactions on Patterns and Machine Intelligence (PAMI)* 19(7): 780-785, Jul. 1997.

E. Scheirer and Malcolm Slaney, "Construction and Evaluation of A Robust Multifeature Speech/Music Discriminator", *Internet Research Corp.*, 1801-C Page Mill Road, Palo Alto, CA 94304 USA.

* cited by examiner

Overall Signal Flow for Presence Detection

Flowchart for Visual Detection

Signal Flow for Visual Presence Detection

Conceptual View of an Image Pyramid

Signal Flow for Template Matching

Signal Flow for Background Imaging

Signal Flow for Background Image Update

Signal Flow for Computing Foreground

Signal Flow for Background Imaging

Signal Flow for Background Image Update

Signal Flow for Computing Foreground

Signal Flow for Color Analysis

Hardware Configuration for Multiple View Analysis

Conceptual View of Variable Timing of Speech

METHODS OF ESTABLISHING A COMMUNICATIONS LINK USING PERCEPTUAL SENSING OF A USER'S PRESENCE

CROSS REFERENCE TO RELATED APPLICATION

This non-provisional application claims the benefit of provisional application Ser. No. 60/247,143, filed 10 Nov. 2000.

FIELD OF THE INVENTION

The present invention relates generally to video or audio conferencing and, more particularly to methods of automatically determining whether and when multiple individuals are simultaneously available to participate in such a conference.

BACKGROUND

In current work environments, interaction between co-workers is becoming increasingly virtual. Transactions that previously occurred face-to-face are becoming more commonly performed via voice and e-mail messages, or through a global computer network or via an intranet web service. While this often greatly increases efficiency and productivity, it has a hidden drawback: there is no longer any "face-to-face" time during which collaborators can exchange information that is not part of a primary transaction. Unit cohesiveness and long-term productivity can suffer when there is no mechanism for physical interaction between team members, or at least interaction via higher bandwidth audio or video conferencing.

Arranging such conferencing time between individuals is currently very difficult, since it requires prior scheduling and coordination of special facilities and dedicated communication links. As the cost of bandwidth declines and connectivity proliferates, however, videoconferencing will become technically feasible on standard desktop computers and web interface devices. The difficulty of scheduling virtual communication will become equivalent to that of arranging physical interaction—that is, finding out whether someone is available to communicate with you at the present time, and if not, to schedule the communication when feasible.

In small office environments, a protocol for communication scheduling is usually carried out by wandering across the hall and seeing if a colleague is in his or her office and not currently occupied with an important task. If a group of people wishes to gather for an impromptu meeting, this can be done informally whenever they see each other to all be physically present. In large office environments spread across many buildings or campuses, or in virtual environments, this becomes infeasible.

Existing solutions for arranging impromptu group communications among physically disparate participants, or for establishing a real-time audio and/or visual communication link, usually involve an equivalent real-time link (e.g. a phone call to see if the person is available. There is no non-intrusive way to simply check if someone is in his or her office and not otherwise occupied in a meeting or other activity, without requiring them to respond to a message, engage a communication link or explicitly specify their state. For example. U.S. Pat. No. 5,960,173, TANG et al., uses an icon 22 (FIG. 9) to indicate a user's activity state. "Buddy lists" and Instant Messaging Presence Protocols (c.f. the IMPP of the Internet Engineering Task Force) are a step towards a solution, but place a burden on the user to signal what mode or activity they are in, and whether they are available. The modes that are relevant to the task of scheduling communication include whether the user was in or out of the office, as well as sub-categories of activity while in the office: whether the user was at a computing device, working at a whiteboard or other surface, meeting with other people, reading something very urgent, on the phone, etc.

These modes are both relevant to the question whether communication is possible now (Is the user present in the office?) and to the question of which is the appropriate method of asking the user if they will "accept the call" and participate in the communication link. The traditional ringing bell of the telephone has long been the notification of a remote user requesting a communication link. Recently, the "caller-ID" service also allows the identity of the remote user to be known before the called party decides whether to accept the call. In most computing environments, pop-up message windows or their equivalent are typically used to notify a user that a "call" is incoming. A prerecorded voice (e.g., "You have a call from Mr. X") may also be used.

These technologies for call notification disregard the current state of the user's activity, and can thus often be intrusive and annoying. While a pop-up display window is an adequate notice when a user is at their computer, it will clearly be ineffective when they are reading at another chair or working at the whiteboard.

A traditional audible notification would be appropriate in these situations, but is not always appropriate during a meeting. Most typically, when one is in a meeting and a communication link is attempted, the appropriate response is to delay the communication until the current meeting is finished.

SUMMARY OF THE INVENTION

It is desirable to have a less intrusive way of determining whether a person is available to participate in a conference. Therefore, the present invention provides a method of automatically perceptually sensing whether a user is available to aid in establishing a real-time communication link between two or more users. Information about a primary user's presence and activity allows a remote user to know if the primary user is available to communicate via videoconference or telephone channels, or in person if the two users are physically co-located. We further describe a device for automatically scheduling a video or audio conference based on the information provided by the user presence device. This scheduling agent is provided with a list of people who need to be available to participate in a given meeting, and will notify each when a quorum of possible participants are available for participation. Finally, we describe how notification of a video or audio call can be performed in an efficient and non-intrusive manner, by adjusting the volume and modality of notification based on the presence and activity state of the primary user.

BRIEF FIGURE DESCRIPTION

DETAILED DESCRIPTION

Figure 1:
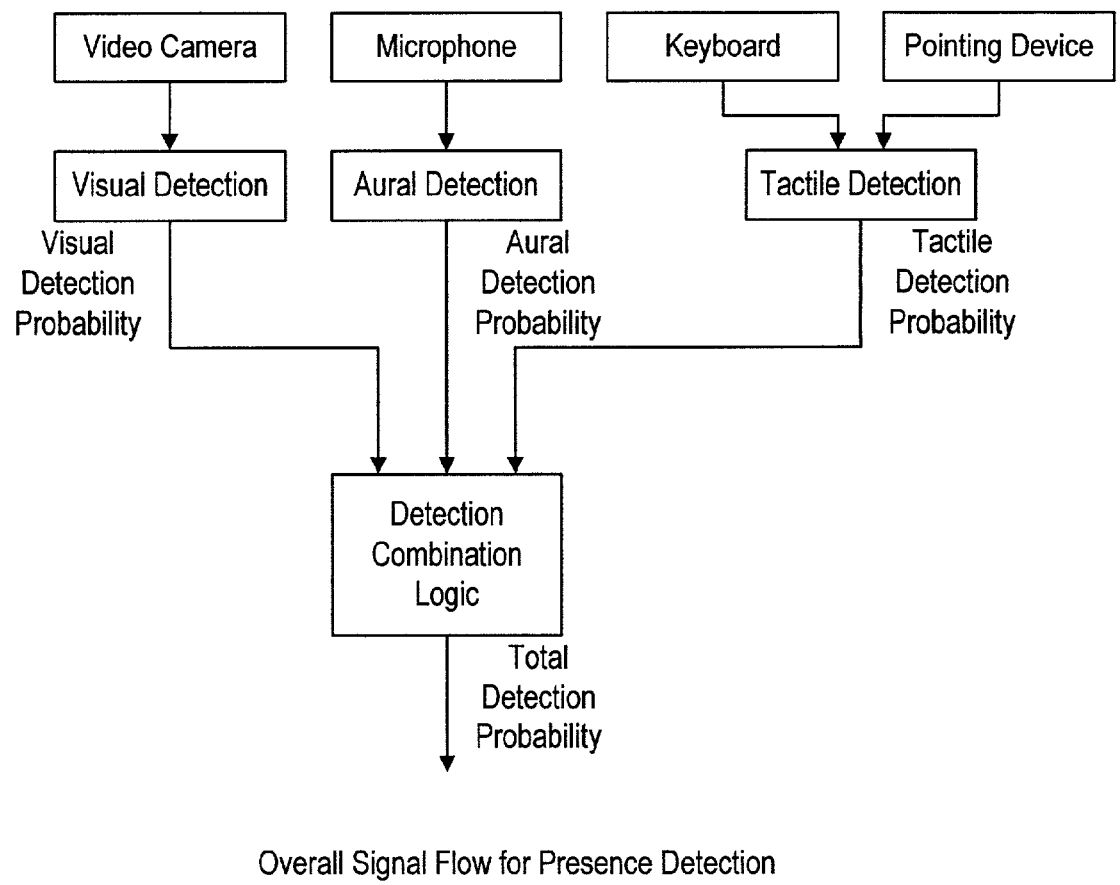
FIG. 1 is a diagram showing the overall signal flow for presence and activity detection.
Figure 2:
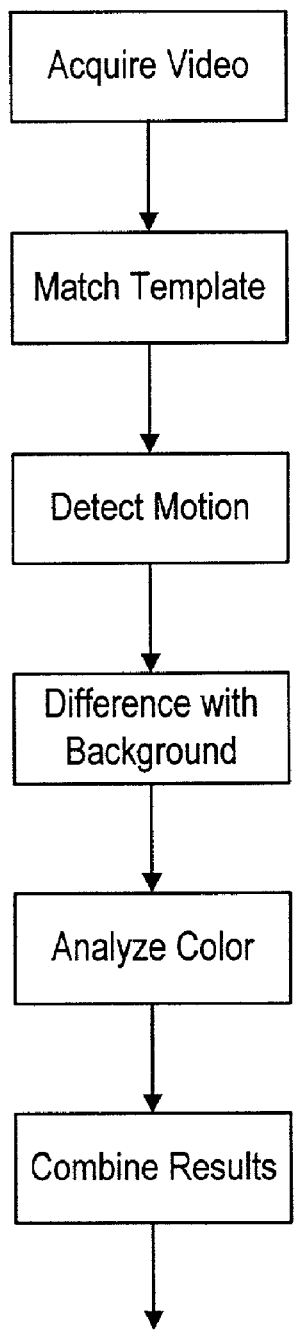
FIG. 2 is a flowchart for visual data processing.

In general, knowledge of the activity state of a user can allow great flexibility in how real-time communication links are scheduled. In the following section, we describe a device which can assess such information about a user via automatic audio and visual perception, and notify remote users whether the person is present in their office, not in a meeting, and thus possible available for communication. We further describe a device for scheduling a conference between multiple participants, which uses a version of the first device at each location to determine when all participants are available. We finally describe a device which adjusts notification of an incoming call request, based on the activity state of a local user.

A) METHOD OF SENSING THE PRESENCE & ACTIVITY STATE OF A USER

It is cumbersome to require a user to manually specify his or her presence and activity state (availability) to a computer interface. We thus have developed a device which can automatically assess these attributes of a user using non-invasive perceptual sensing techniques. We use methods from machine perception and computer vision to detect the presence of a user and classify his or her activity into a number of classes.

In a desktop PC configuration, we preferably use a standard consumer videoconferencing camera with wide-angle lens placed on top of a personal computer monitor and a standard microphone coupled to a sound card in the computer. We have developed a software component which analyzes the visual and audio information from the camera and microphone, and records the presence and activity of the user. When activity from a computer input peripheral device, for example a mouse or keyboard or command microphone, has been recently detected by the computer's operating system, we perform no analysis of the visual image from the camera, and record that the user is present and is working at the computing device.

When the user's presence and activity cannot be inferred from activity of peripheral devices, our software analyzes the video image and audio signal to determine whether the person is still near the workstation area or is visible elsewhere in the office, classroom, or other predefined space. By "predefined space," we do not necessarily mean a room having walls. For example, a workstation could be a computerized information kiosk in a shopping mall or a playground, and one could program a computer to speak to any person who comes within a predetermined radius of the kiosk, offering directions to a store or offering to place a call to a mobile phone of a lost family member. Using commercially available speech recognition technology, such as that available from IBM, Philips or Lernout & Hauspie, a kiosk could solicit information even from persons unable to read or type, e.g. blind persons or small children. Our system utilizes several visual processing modules: motion and background analysis, color analysis, and face pattern detection.

MOTION AND BACKGROUND ANALYSIS—detects motion of objects (including people) in a room. We prefer to use methods based on Wren, C., Azarbayejani, A., Darrell, T., Pentland A., "Pfinder: Real-time tracking of the human body", *IEEE Transactions on Patterns and Machine Intelligence (PAMI)* 19(7): 780–785, July 1997, but other techniques such as those described in Grimson, W. E. L., Stauffer, C., Romano, R., Lee, L. "Using adaptive tracking to classify and monitor activities in a site", *Proceedings of the IEEE Conference on Computer Vision and Pattern Recognition,* Santa Barbara, Calif., 1998, could also be used. Although regular visible-spectrum sensing is preferred, one could also use infrared sensing in appropriate situations, e.g. a darkened room.

COLOR ANALYSIS—detects skin color regions. Infers presence of people when a moving flesh color region of appropriate size is seen. We use methods based on N. Oliver, A. Pentland, F. Berard, "LAFTER: Lips and face real time tracker," *Proceedings of the IEEE Conference on Computer Vision and Pattern Recognition,* 1997, and Y. Raja, S. J. McKenna, S. Gong, "Tracking and segmenting people in varying lighting conditions using colour," in *Proceedings of the International Conference on Automatic Face and Gesture Recognition,* 1998, but other techniques such as those described in S. Birchfield. "Elliptical head tracking using intensity gradients and color histograms," *Proceedings of the IEEE Conference on Computer Vision and Pattern Recognition,* Santa Barbara, Calif., 1998, could also be used. For example, analysis of an image can tell whether a person is moving in a manner indicative of reading.

FACE PATTERN RECOGNITION—recognizes the primary user. We use methods based on H. Rowley, S. Baluja, and T. Kanade, "Rotation-Invariant Neural Network-Based Face Detection," in *Proceedings of the IEEE Conference on Computer Vision and Pattern Recognition,* June, 1998, but other techniques such as those described in K.-K. Sung and T. Poggio, "Example-based Learning for View-based Human Face Detection," AI Memo 1521/CBCL Paper 112, Massachusetts Institute of Technology, Cambridge, Mass., December 1994 and Tom Rikert, Mike Jones and Paul Viola, "A Cluster-Based Statistical Model for Object Detection," *Proceedings of the International Conference on Computer Vision,* 1999, could also be used. Such software could also be used to detect if a person is holding a telephone receiver to their ear, or wearing a headset having a protruding microphone.

SPEECH DETECTION—we analyze the audio signal to discriminate whether users are speaking in the office near the computing device. We utilize a method which can discriminate speech from music and background noise, based on the method presented in Schrier, E., and Slaney, M. "Construction and Evaluation of a Robust Multifeature Speech/Music Discriminator," in *Proceedings of the* 1997 *International Conference on Computer Vision, Workshop on Integrating Speech and Image Understanding,* Corfu, Greece, 1999. Analysis of pauses in speech can indicate whether a person is engaged in a conversation, either with another person in the same room, or with someone at another location. A radio scanner could sense whether a conversation is accompanied by radio-frequency radiation indicative of a wireless phone call.

Based on the information from these sensors, we record the following attributes describing the state of the room:

Is Primary User Present in Room?
Are Other People Present in Room?
Is Speech Detected?
Is User at Workstation?

In an alternative embodiment, one can extend this system to include attributes that represent explicitly the interactions between individuals (e.g. denoting users in discussion), and additional classes of activity (e.g. denoting a user reading printed material).

These attributes are stored in a server process, which exports them to any authorized clients. Three examples of such clients are described in the following sections.

DESCRIPTION OF THE PREFERRED METHODS

Presence Detection

Human Presence is detected by a combination of visual, aural, and tactile methods. Each of these methods will be described in detail in subsequent sections. These methods are preferably implemented by a software algorithm which runs on a suitably powerful computing device such as an IBM-compatible computer having a PENTIUM microprocessor made by Intel or functional equivalent thereof, and suitable peripheral sensing devices connected thereto. Such sensing devices preferably include a digital video camera, a microphone, a keyboard and a mouse or other pointing device. FIG. 1 shows the overall signal flow for presence and activity detection.

Visual Detection

Figure 3:
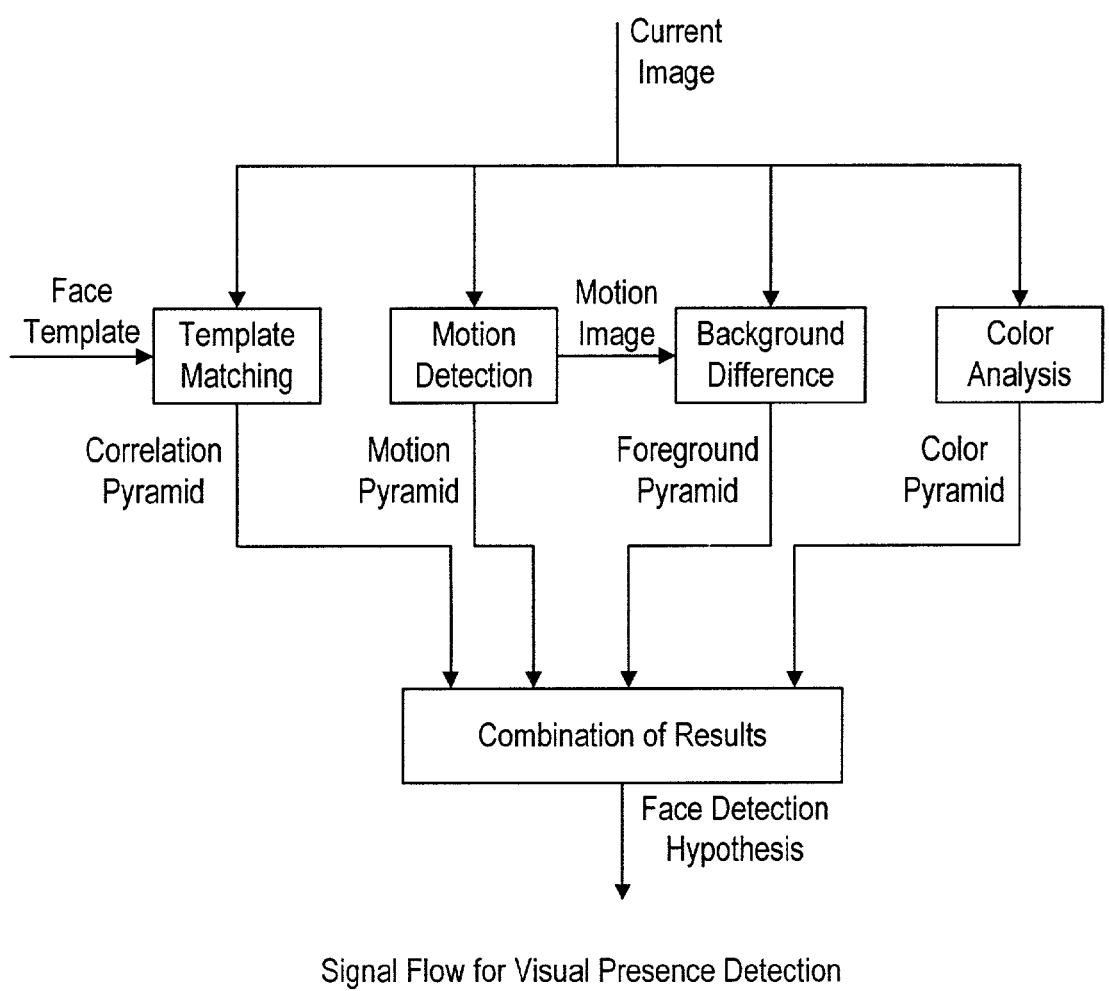
FIG. 3 illustrates signal flow for visual presence detection.

Detecting human presence by visual methods involves analyzing a video stream gathered by a camera focused on the area of interest. The system uses a combination of template matching, motion detection, background differencing, and color analysis to detect a human in the video stream. Each of these methods will be described in detail below. The overall signal flow of visual presence and activity detection is illustrated in FIG. 3. The methods are performed by respective subroutines which operate on a common set of data structures stored in random access memory under a series of variable names including currentImage, motionImage, motionPyramid, correlationPyramid, foreground Pyramid, and colorPyramid. The arrival of a new frame of video (currentImage) triggers a processing pass through these subroutines. The results of a processing pass are stored in a set of face detection hypotheses. Each hypothesis consists of a location and scale for a possible face image and a probability number indicating the likelihood that a face of that size is located at that location.

Video Acquisition

The first step in visual detection is to acquire the image stream. In the preferred embodiment, a stream of images is gathered using a camera attached to the Universal Serial Bus (USB) of a Personal Computer (PC) running the Microsoft Windows 2000 operating system. Standard Windows Driver Model (WDM) methods (Oney 1999) are used to bring individual frames of the video sequence into a storage area, called currentImage, in Random Access Memory when requested by the downstream processing.

The camera driver is configured to deliver the image in YUV format (Mattison, 1994, p. 104). In this format, each pixel of the image is represented by three 8-bit numbers, called channels. The color information is contained in the U and V channels, and the intensity ("black and white") information is contained in the Y channel.

The processing for visual detection works on the image stream as a continuous flow of information and produces a continuous stream detection hypotheses To control the amount of processing resources consumed by this algorithm, a software timer is used to control the number of frames per second that are fed from the camera. Typically, 15 frames per second are processed.

Template Matching

Figure 6:
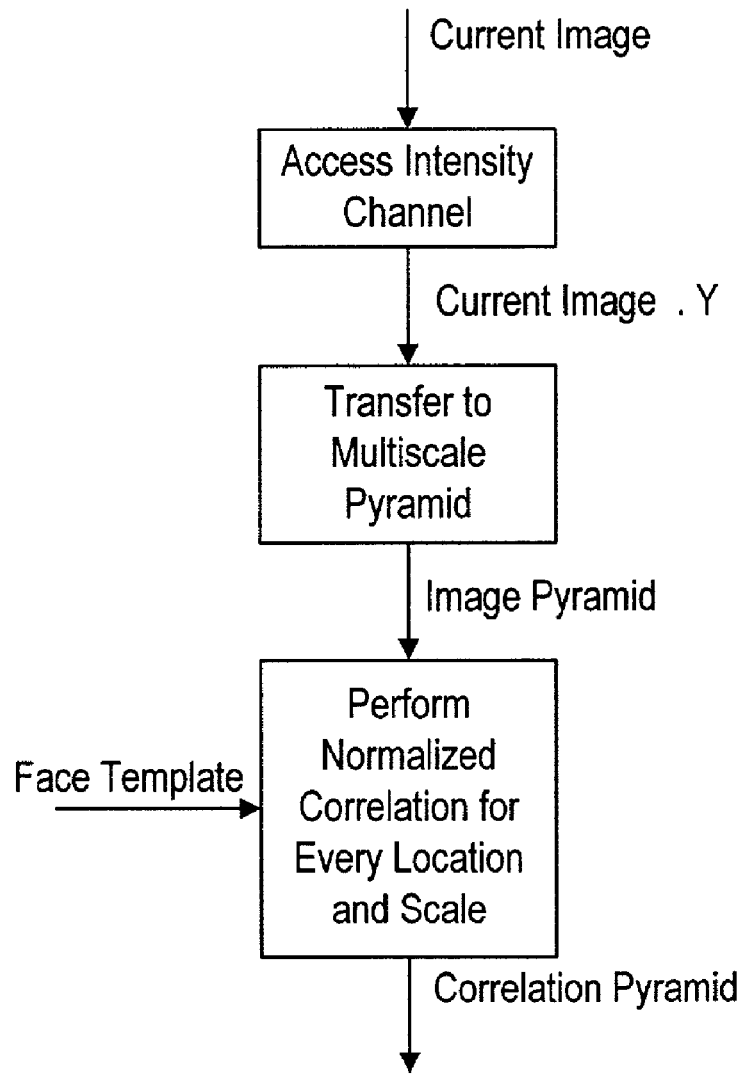

FIG. 6 shows the signal flow for template matching. Template matching involves searching the intensity channel of the image for a section (patch) that is similar to a reference image (template) of the same size. The template represents the expected appearance of the object being sought. A number of templates may be used to represent all of the variations in appearance of the object. To search for a face, templates that represent the range of appearance of the types of faces sought are used. To minimize the computational load, the preferred embodiment uses a single template derived by averaging a large population of face images. If desired, greater detection accuracy can be achieved at the cost of a greater computational load by using multiple templates. Furthermore, the detection algorithm can be tuned to recognize a particular user by selecting templates that match the range of appearance of that user.

The degree of similarity of the patch to the template is measured by the normalized cross-correlation of their intensities (Haralick and Shapiro, 1993, p. 317; Jain, Kasturi, and Schunck, 1995, p. 482; Russ, 1995, p. 342). To implement normalized correlation, first the template is normalized to have zero mean and unit variance. That is, the mean of the all the pixels in the template is computed and subtracted from every pixel, and then the square root of the variance of the pixels is computed and used to divide every pixel. Similarly, the patch is normalized to have zero mean and unit variance. The normalized cross correlation is then computed by averaging the products of the corresponding pixels of the normalized template and the normalized patch. A result with 1.0 represents a perfect match.

Since the location of the face is initially unknown, the algorithm examines every possible shift of the template relative to the image. The algorithm organizes the results of all of these correlations by storing them in a two-dimensional, floating-point array, which can be thought of as a floating-point image and is called a correlation map. The value stored in particular location of the correlation map is the result of the normalized cross-correlation of the template and a patch centered at the corresponding location of the image.

Because the size of the face image may also vary, a multi-scale search is performed. This could be accomplished by using several templates of varying sizes; however, a more efficient method is to keep the template size the same and rescale the image. By shrinking the image and keeping the template the same size, the algorithm can search for a larger face in the original image.

Figure 4:
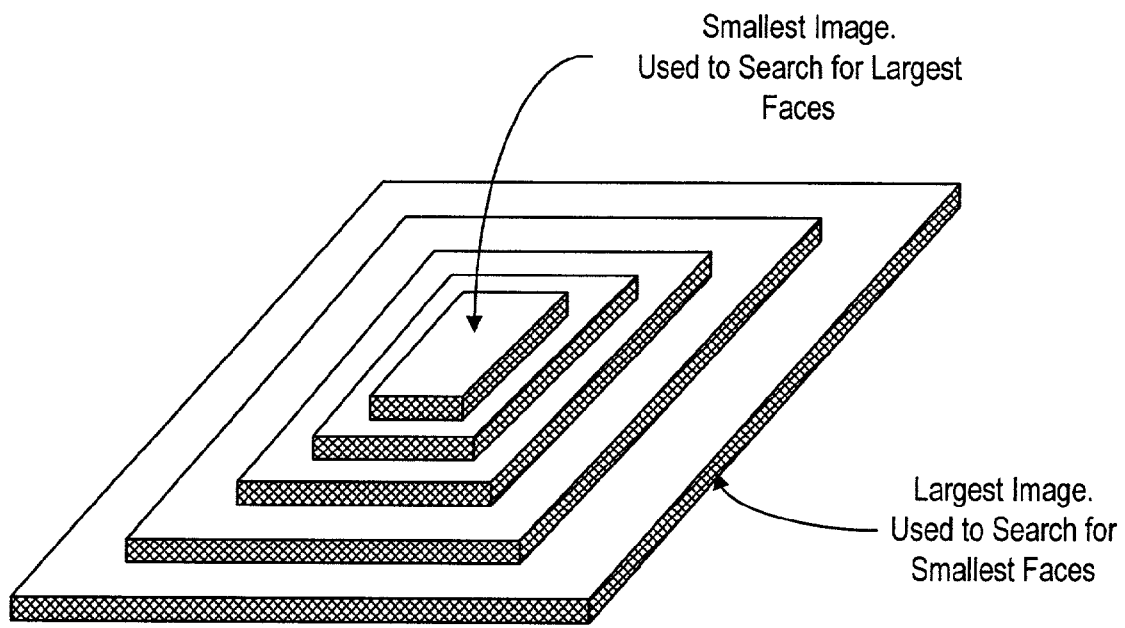
FIG. 4 is a conceptual view of a image pyramid.

To organize this process, the algorithm uses image pyramids. FIG. 4 illustrates the concept of an image pyramid. An image pyramid is a sequence of images where each image is slightly smaller than the previous one in the sequence. It is called a pyramid because, if you imagine the images as being stacked on top of one another, they would look like a pyramid. Each image in the pyramid is called a layer.

Usually, the ratio of dimensions of one layer of the pyramid to those of the previous layer is a constant value. In the preferred embodiment, this ratio is 0.9. In conjunction with this ratio, the number of layers in the pyramid determines the range of face sizes that can be found with a single template. The preferred embodiment uses seven layers. This supports searching for face sizes that can vary by as much as a factor of two.

To search for faces of varying sizes, the algorithm maps the intensity values (Y channel) of the incoming image onto a pyramid of smaller images. Call this pyramid inputPyramid. The algorithm computes the value for a pixel (target pixel) in one of the layers of inputPyramid (target layer) by averaging pixels in a rectangle in the incoming image. The dimensions of this averaging rectangle are determined by the ratio of the dimensions of the incoming image to the corresponding dimensions of the target layer. The center of the averaging rectangle is determined by scaling the coordinates of the target pixel by these same dimension ratios.

Next, the algorithm uses the template to compute the correlation map for each layer. These correlation maps are stored in a floating-point image pyramid called correlationPyramid. The number of layers in correlationPyramid is the same as in inputPyramid, and the dimensions of corresponding layers in these two pyramids match.

The result of these calculations is an image pyramid, correlationPyramid, where each pixel in the corresponds to the similarity the template to a patch of a particular size (scale) and at a particular location in the input image. A value near 1.0 indicates that a face is likely to be at that scale and location.

Motion Detection

Figure 5:
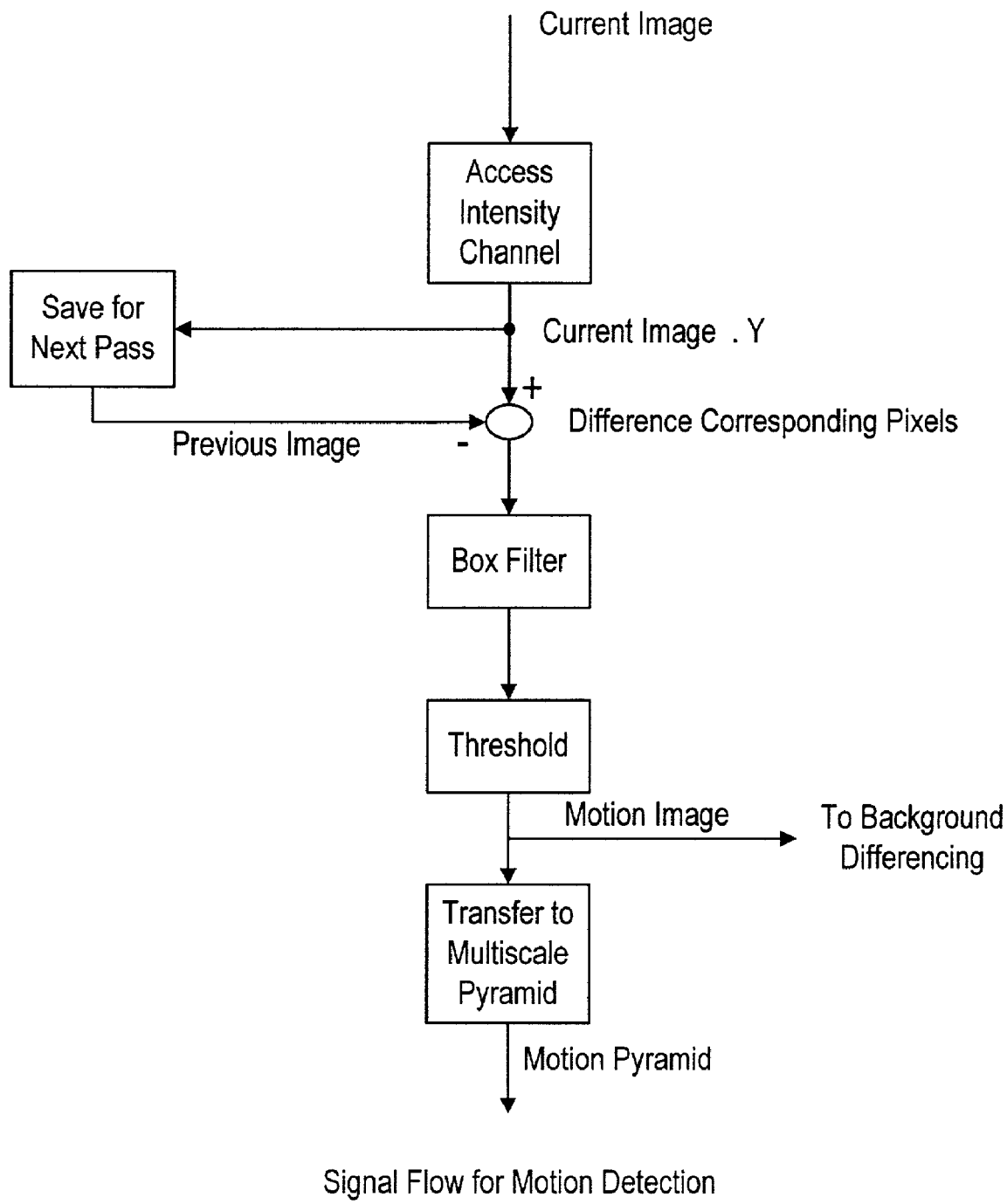
FIGS. 5–17 are further diagrams illustrating specific aspects of the invention.

FIG. 5 illustrates the signal flow for motion detection. To support both motion detection and background differencing, the algorithm computes the absolute value of the difference between corresponding pixels of the Y channel of currentImage and previousImage, an 8-bit image which stores the Y channel of image from the previous pass. The results are stored in an 8-bit image called motionImage. (On the initial pass, motionImage is simply set to all zeros.) After computing the difference, the Y channel of currentImage is copied to previousImage.

A box filter (explained in the next sequence) is applied to motionImage to fill in holes which result from areas of the face that did not change significantly from frame to frame. A box filter is a neighborhood averaging method (Russ, 1995, p. 155) that modifies an image by replacing each pixel value with the average of all pixels in a rectangle (box) surrounding it. The preferred embodiment uses a 5 by 5 box.

To eliminate spurious noise, a threshold operation is applied to motionImage. In other words, any pixel below a specified threshold is set to zero and any pixel above the threshold is set to 255. The preferred embodiment uses a threshold of 20.

To facilitate later combination with other results, the algorithm builds an image pyramid, called motionPyramid, from motionImage. This pyramid has the same number of layers and dimensions as correlationPyramid. The same averaging scheme used to build inputPyramid (described above) is used to build motionPyramid from motionImage.

The result of these operations is an image pyramid, motionPyramid, where each pixel in the pyramid is a number between zero and 255. The value indicates how much motion is near the corresponding point in the incoming image. A value of zero indicates that there is no significant motion nearby.

Background Differencing

Figure 7:
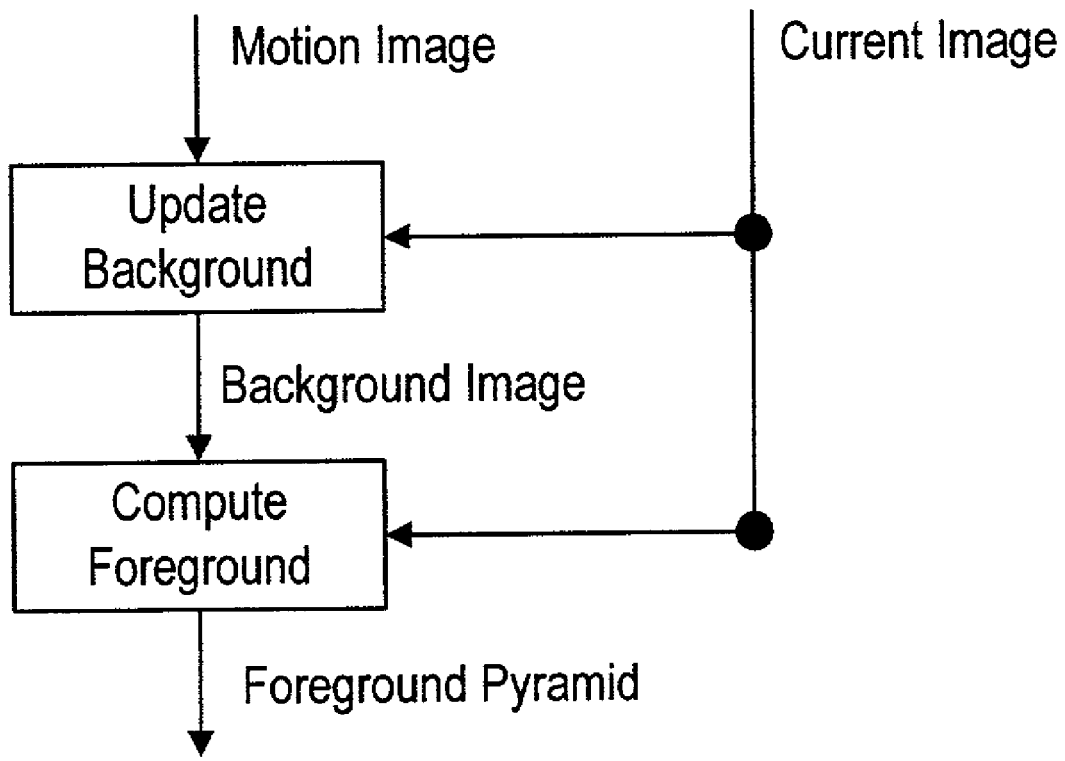
Figure 8:
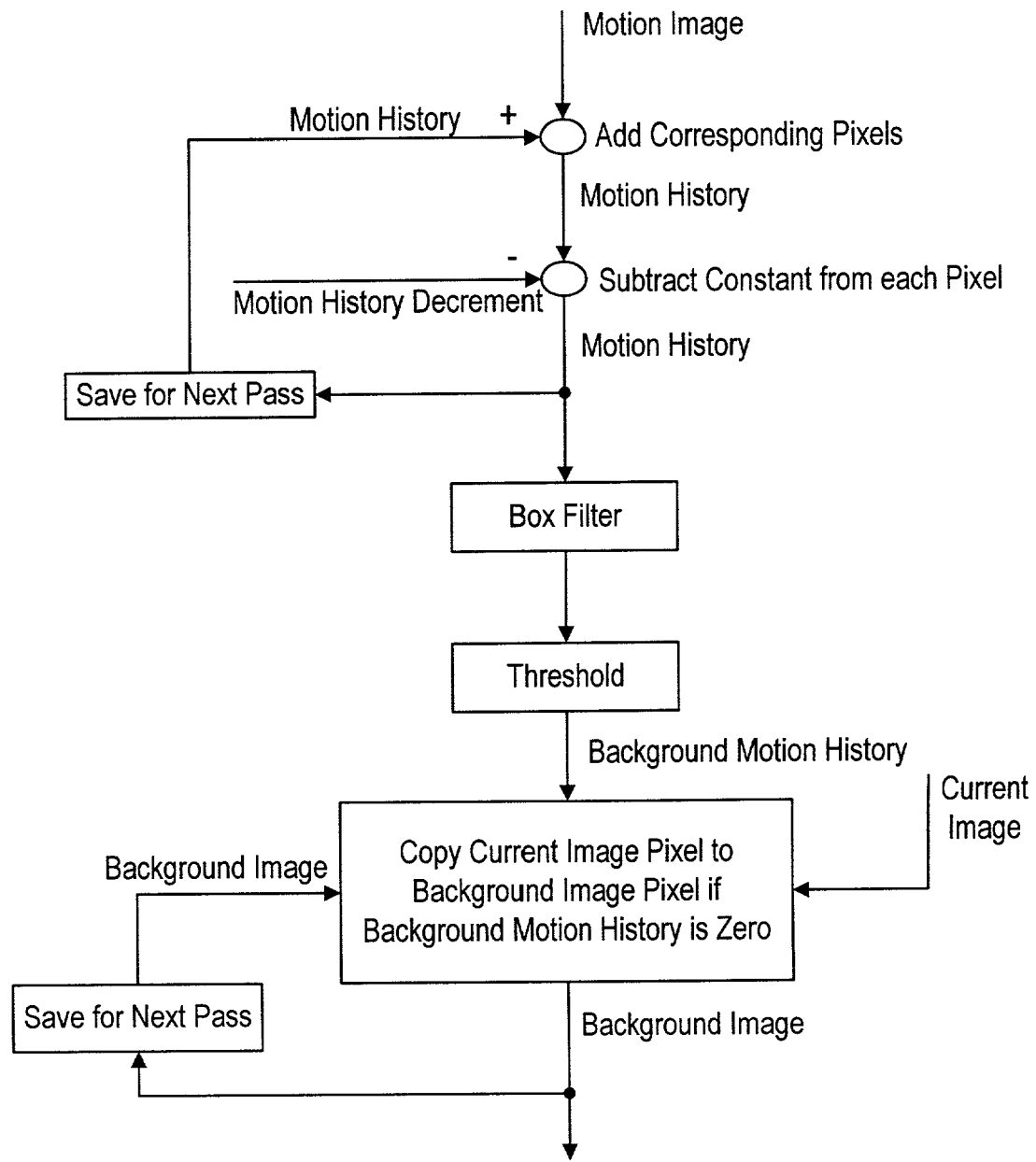

The signal flow for background differencing is shown in FIG. 7. As shown in this illustration, background differencing consists of two subprocesses: updating the background and computing the foreground. The signal flow for these background updating is shown in FIG. 8. To update the background, the algorithm first computes a motionHistory image. This is an 8-bit image where each pixel value indicates how long it has been since there was motion at that location. The motionHistory image is initialized to zero at program startup. On each pass, motionImage is added to it, using saturation arithmetic. (Saturation arithmetic avoids overflow and underflow in integer operations.

In the case of 8-bit unsigned integers, saturation arithmetic limits the result to be no larger than 255 and no smaller than zero. For example, if 150 and 130 are added, the result is limited to 255. Without saturation arithmetic, adding 150 and 130 would produce overflow and the result would be 24.

The memory of the motion is decayed by decrementing each pixel of motionHistory by a value of motionHistoryDecrement once every motionHistorySkip frames. The amount and frequency of the decrement determines how fast the motion history will decay; a larger value of motionHistoryDecrement and a smaller value of motionHistorySkip produces a faster decay. In the preferred embodiment, motionHistoryDecrement is set to one and motionHistorySkip is set to four, which means that the motion history will decay to zero after 1020 frames (68 seconds). This means motion more than 68 seconds ago ceases to influence the algorithm. To update the background image, the algorithm copies motionHistory into another 8-bit image, backgroundMotionHistory, which is then blurred using a box filter. The preferred embodiment uses a 20 by 20 box filter. Then a threshold operation (with a threshold of one) is applied to set all pixels of backgroundMotionHistory to 255 unless there has been no motion near them during the decay period.

Figure 9:
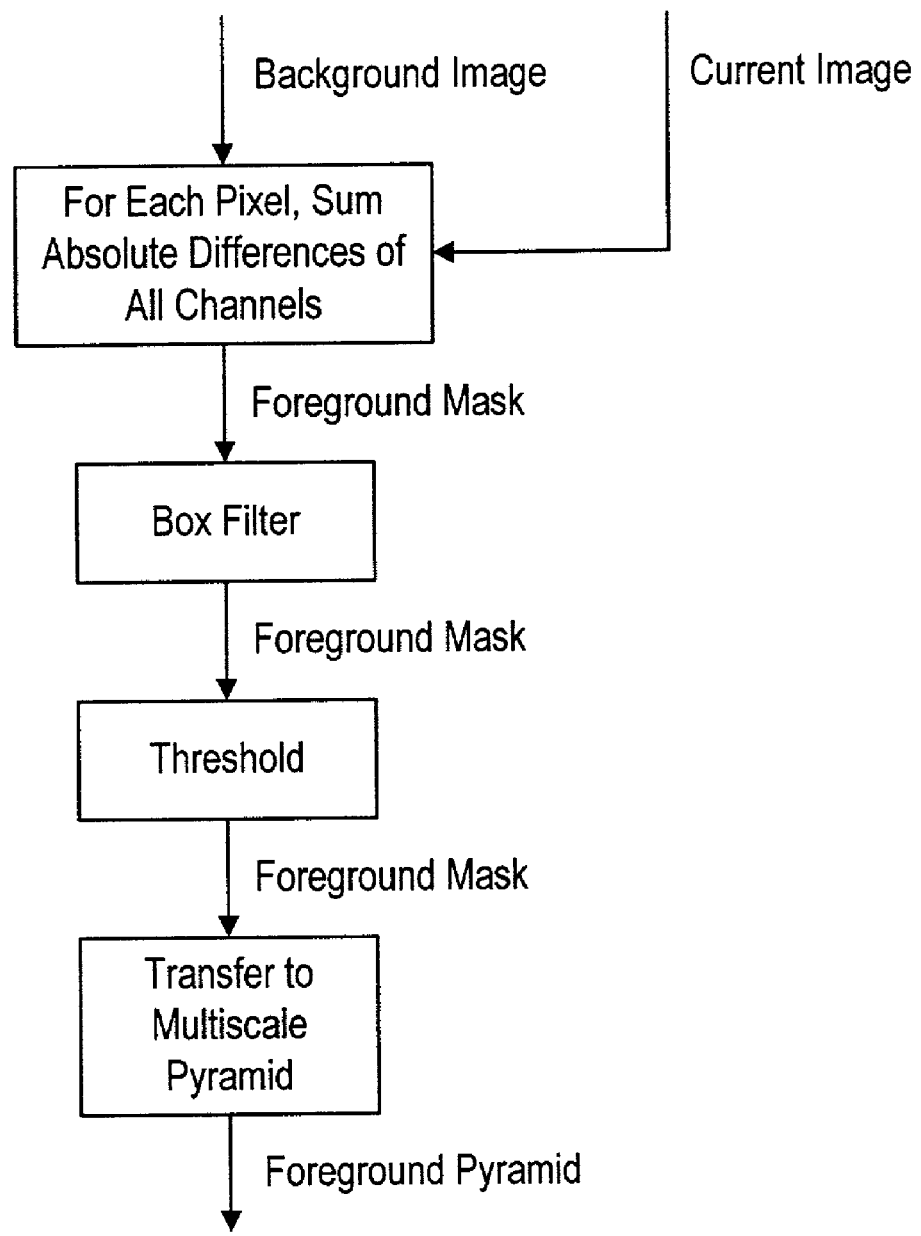
Figure 10:
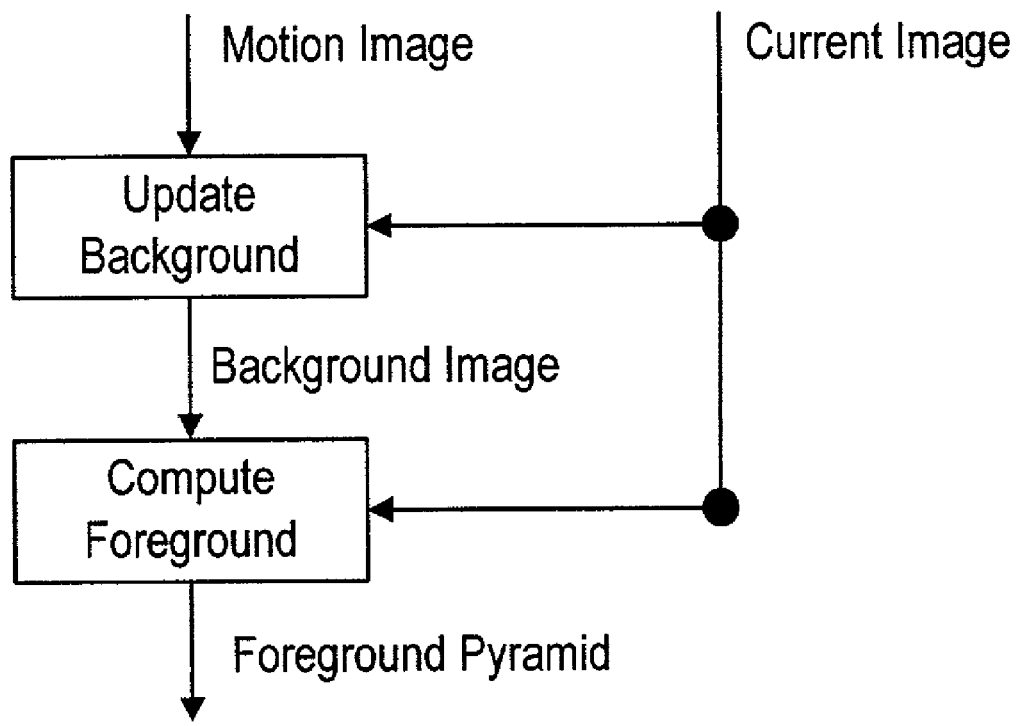
Figure 11:
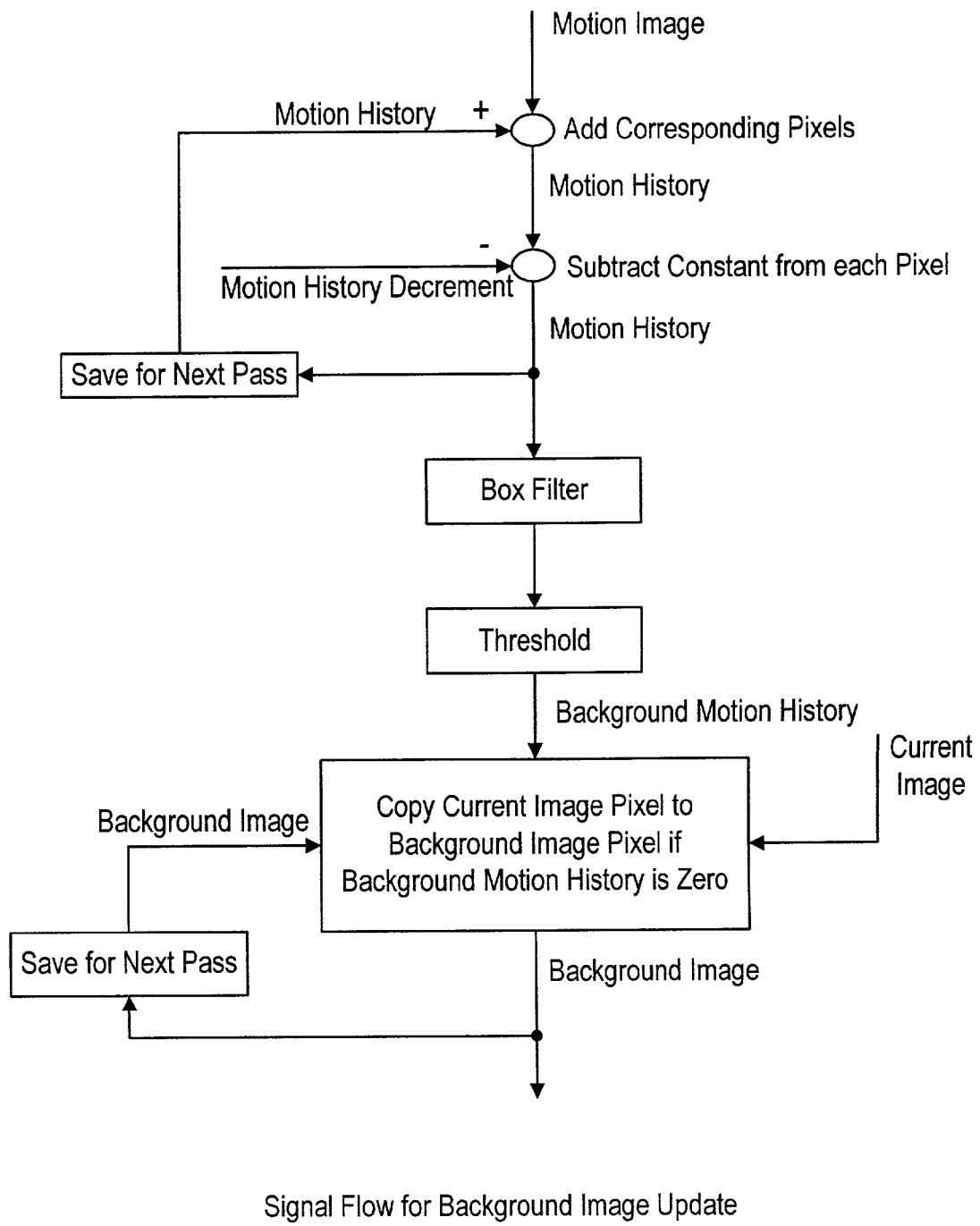
Figure 12:
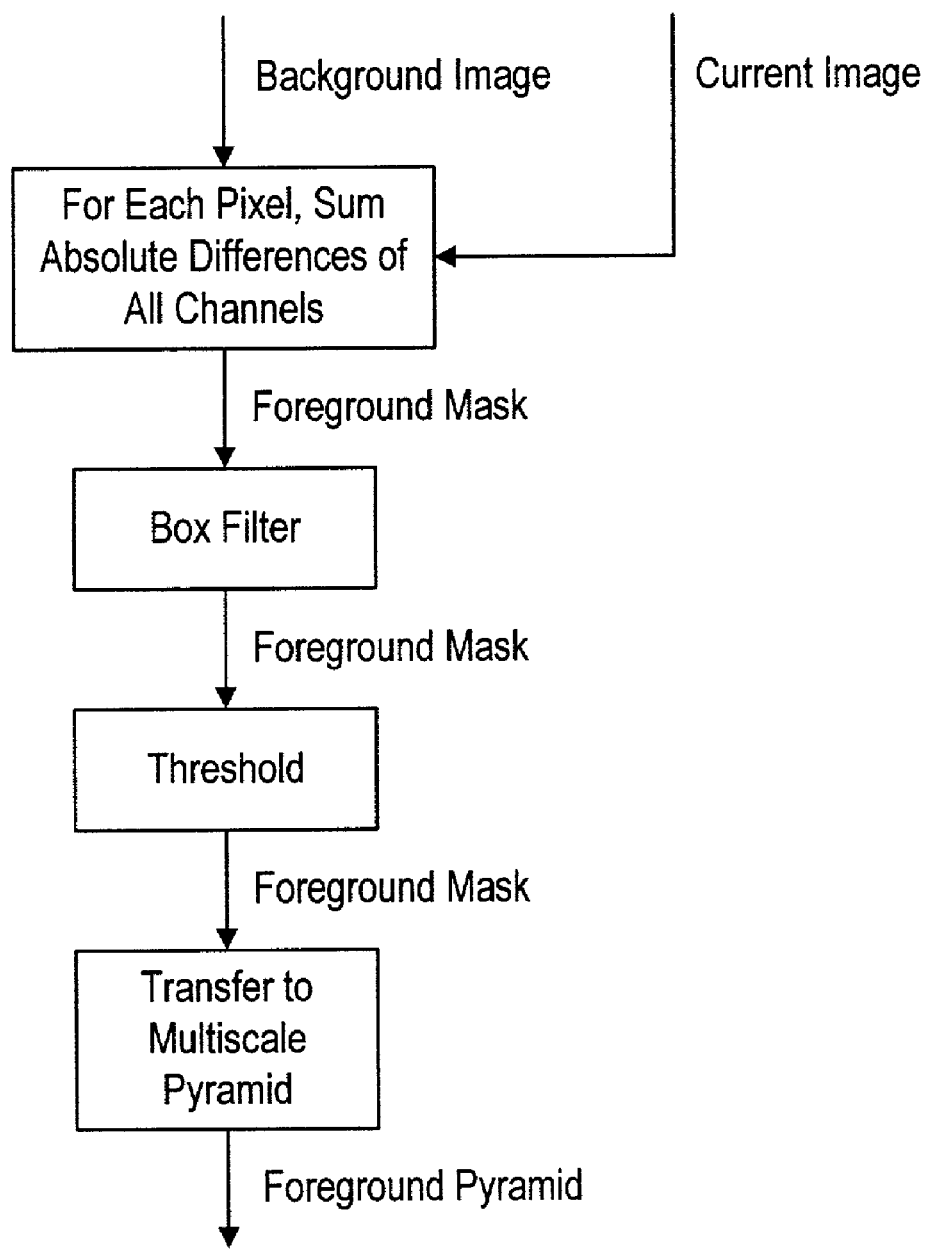

If a pixel of backgroundMotionHistory is zero, it indicates that there has been no motion near it for a significant amount of time. In the preferred embodiment, a pixel in backgroundMotionHistory will be zero only if there has been no motion within 10 pixels of it during the last 68 seconds. In this case, all three channels of the pixel at this location in currentImage are copied into the 8-bit YUV image, backgroundImage. Next, the foreground image is computed as illustrated in FIG. 9. For each pixel in currentImage, the absolute value of the difference of each channel (Y, U, and V) with the corresponding channel of backgroundImage is computed, and they are all summed to produce a total absolute difference. As before, saturation arithmetic is used to avoid overflow problems. These results are stored in the corresponding pixel location of an image called foregroundMask. Next a 10 by 10 box filter is applied to foregroundMask to smooth out any noise effects. Then a threshold operation is applied to foregroundMask. As a result of these operations, each pixel in the resulting image, foregroundMask, will be set to 255 if there is any significant difference between backgroundImage and currentImage at within 10 pixels of that location and will be set to zero otherwise. The preferred embodiment uses a threshold of 20 to establish what is a significant difference.

To facilitate later combination with other results, the algorithm builds an image pyramid, called foregroundPyramid, from foregroundMask. This pyramid has the same number of layers and dimensions as correlationPyramid. The same averaging scheme used to build inputPyramid (described above) is used to build foregroundPyramid from foregroundMask.

The result of these calculations is an image pyramid, foregroundPyramid, where each pixel is a number between zero and 255. The value indicates how many foreground (non-background) pixels are near the corresponding point in the incoming image. A value of zero indicates that only background pixels are nearby.

Color Analysis

Figure 13:
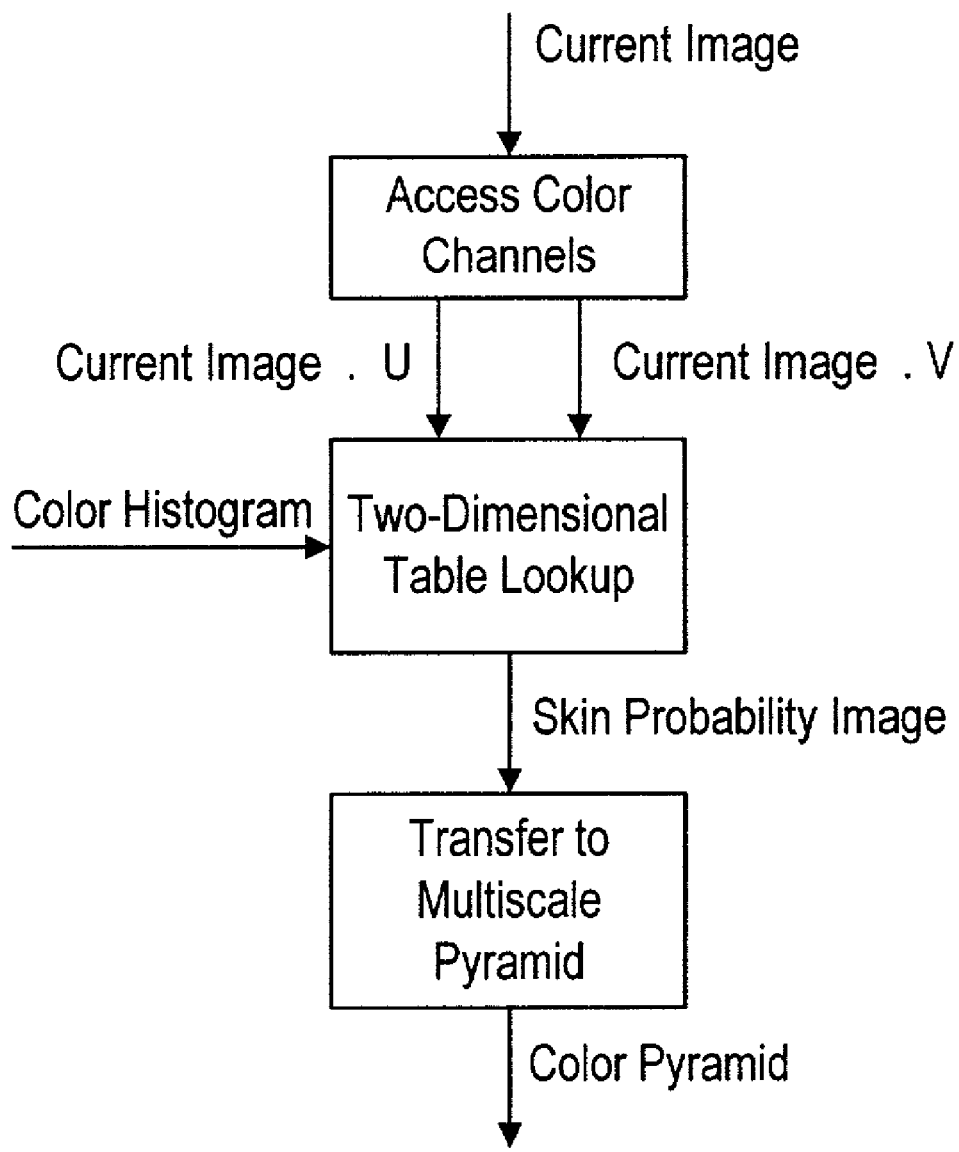

Performing color analysis involves determining for each pixel in the current image the likelihood that it is the color of human skin. FIG. 13 illustrates the process. Since only the U and V channels in currentImage contain color information, only these channels need to be examined. In this implementation, the 8-bit values for U and V are used to index into a 256 by 256 array to look up the likelihood that combination of U and V represents skin. This lookup table, which is called colorHistogram, is represented by an 8-bit deep, 256 by 256 image. For each pixel in currentImage, its U value is used as the row index and its V value is used as the column index to lookup the likelihood that the pixel represents skin. This likelihood, which is represented by a number between zero and 255, is then placed in the corresponding pixel location of the result, skinProbabilityImage. Once again, to facilitate later combination with other results, the algorithm builds an image pyramid, called in this case colorPyramid, from motionImage. The same averaging scheme used to build inputPyramid (described above) is used to build colorPyramid from skinProbabilityImage. This pyramid has the same number of layers and dimensions as correlationPyramid.

The result of these operations is an image pyramid, colorPyramid, where each pixel is a number between zero and 255. The value indicates how much skin color is near the corresponding point in the incoming image. A value of zero indicates that there is no skin color nearby.

The lookup table for skin probability, colorHistogram, can be set to a default table or can be "trained" during use, i.e. the computer can be trained to assign a higher probability to sensed values which are close to the skin tones of the computer's regular user or users. A menu selection allows the user to bring up a window showing the live video. The user can then click on an area of skin in the image. The values of U and V, call them $u_r$ and $v^r$, are extracted from the pixel that was clicked on and used to modify the lookup table by adding $\exp\{-[(u-u_r)^2+(v-v_r)^2]/(2*d^2)\}$ to the value in the corresponding (u, v) location of the table using saturation arithmetic. The assumption is that colors near the color of the selected point are like to also be skin. A Gaussian form is used, somewhat arbitrarily, to express this assumption. In the preferred embodiment, the value of d is chosen to be 2.

Combination of Results

Figure 14:
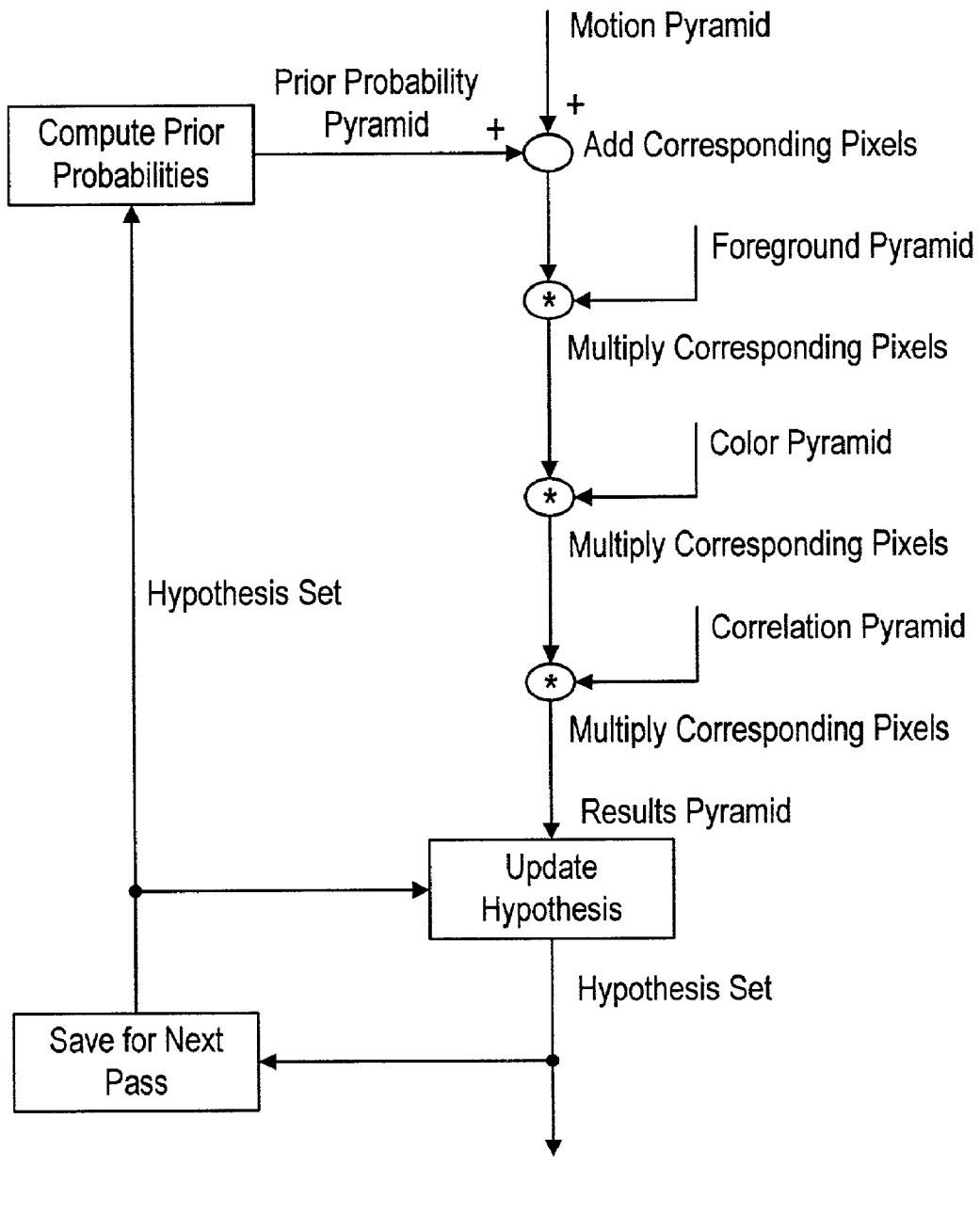

FIG. 14 shows the method used to combine all of the previous results. The algorithm combines the quantities calculated in the previous steps in a fairly simple manner and stores the results in a pyramid, resultsPyramid, which is the same size as all of the others. This pyramid is searched for likely face detections, which are stored in a set of hypotheses. Each hypothesis contains a location, a scale, and a probability number. The probability of having detected a face is taken be the largest of these probability numbers.

Since the frame rate of processing is relatively high, if a face was found in the previous frame, it is likely that a face will be found at a nearby location and scale in the current frame. Therefore, there is value in carrying information from one pass to the next. This is done by means of a prior probability pyramid, priorPyramid. This pyramid has the same number of layers and the same dimensions as all of the other pyramids. A pixel in a layer of this pyramid represents the probability that a face may be at the corresponding location and scale based only on what was found in the previous frame. The method for computing the pixel values of this pyramid will be explained below, after the combination method is described.

The first step in the combination process is to add corresponding pixels of priorPyramid and motionPyramid and to store the result in the corresponding pixel of resultsPyramid. At this point, a pixel in resultsPyramid represents the probability that there is a face at that particular location and scale based having either seen a face nearby on the last pass or on having seen nearby motion on this pass.

Next corresponding pixels in resultsPyramid, colorPyramid, and correlationPyramid, are all multiplied together and stored back in resultsPyramid. After this operation, a pixel in resultsPyramid represents the probability that a face is at that location and scale, based on all available and computed information. Since the values are stored as 8-bit unsigned integers, they range from zero to 255. A value near 255 represents a high probability that there is a face at the corresponding location and scale in the incoming image.

This method of combination reduces the number of false matches. To indicate the presence of a face at a particular location and scale, there must be (1) either significant motion near the location or a previous sighting of a face at that location and scale, (2) significant difference from the background (pixels that have not changed for 68 seconds), (3) a significant amount of skin color near the location, and (4) a large positive correlation with the face template.

At this point, the algorithm could find all faces in the image by exhaustively searching resultsPyramid for all locations that represent high probabilities. However, since an exhaustive search would be very expensive, a randomized search method is used. To implement the randomized search, a number of hypotheses are maintained from pass to pass. Each hypothesis has a location and scale and will be assigned a probability number representing the likelihood that there is a face at this location and scale. At program startup, the location and scale values are chosen randomly and the probability is set to zero. At the end of each pass, these numbers are updated as follows. The algorithm searches resultsPyramid for a maximum in a limited neighborhood around the location and scale that the hypothesis had on the last pass. If this maximum, which represents the probability of a face, is above a threshold (typically 0.6) then the hypothesis takes on the location and scale where this maximum was found and the probability is retained. Otherwise, the new location and scale for the hypothesis are chosen randomly and the probability is set to zero. Because the algorithm operates at a relatively high frame rate (typically 15 frames per second) and a fairly large number of hypotheses are used (typically 20 or more), the algorithm can locate a face after only a few frames of video. This approach allows the algorithm the flexibility to locate several faces in the image with a reasonably small computational load.

At the end of the pass, the hypotheses with non-zero probabilities are used to compute the prior probability pyramid for the next pass. First, all pixels in priorPyramid are set to zero. Then for each of these hypotheses, a probability distribution is added to priorPyramid around the location and scale of that hypothesis. In the preferred embodiment, a Gaussian distribution is used.

Aural Detection

Aural detection involves analyzing sound acquired from a microphone to detect the presence of a human voice. The algorithm described below relies on detecting the unique characteristics of vowel sounds to distinguish a human talking from other background noises.

Sound Acquisition

A continuous stream of sound is acquired from a standard PC microphone. For Microsoft Windows operating systems, there are standard procedure calls to gain access to this information. A 16 kHz sampling rate is used. The sound stream is loaded into a 1028-element circular buffer, called soundBuffer. (A circular buffer permits an incoming sound sample to replace the oldest sample without moving any other data.) Thus, the soundBuffer maintains a running history of sound samples covering a little more than 64 milliseconds.

Vowel Sound Detection

Figure 15:
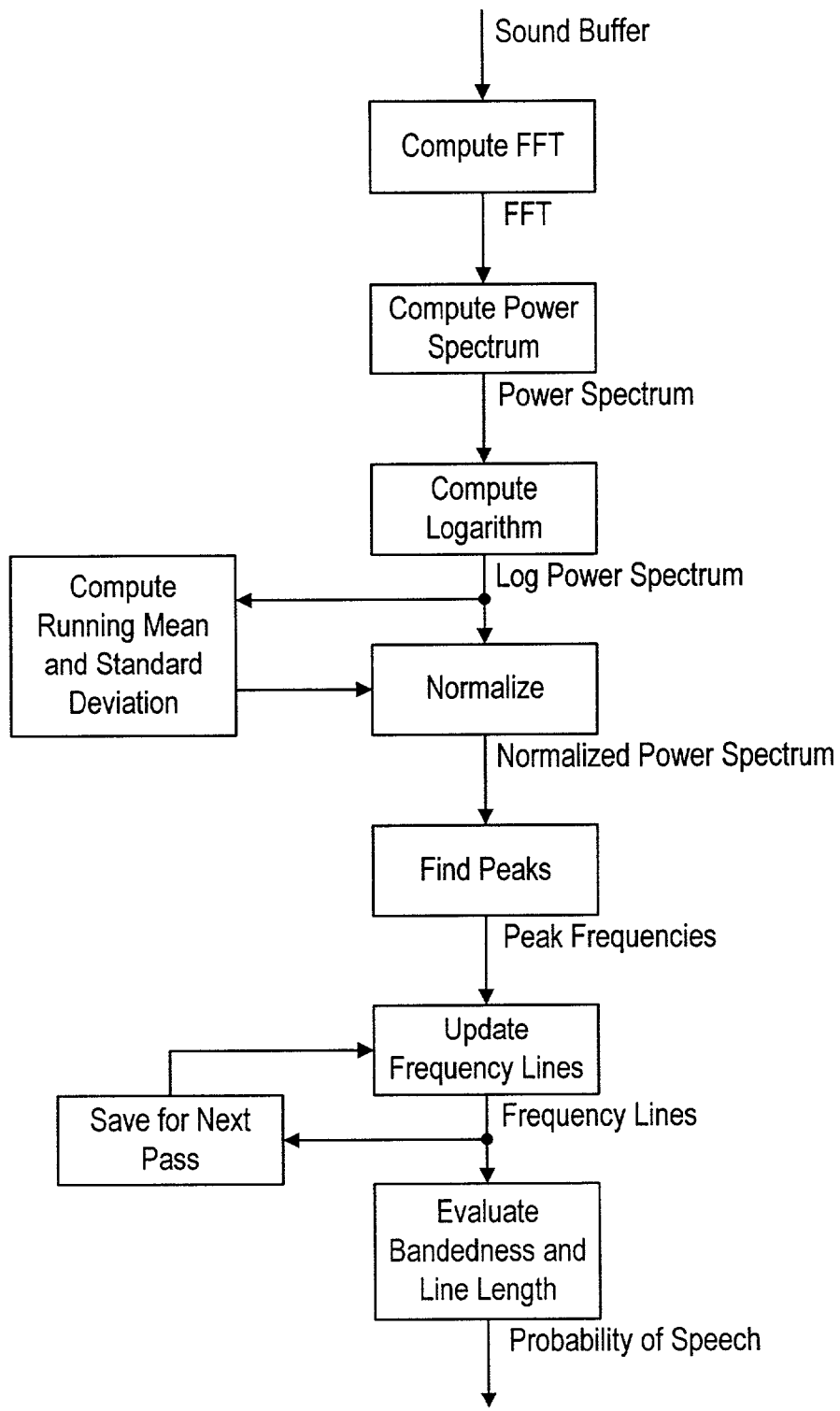
Figure 16:
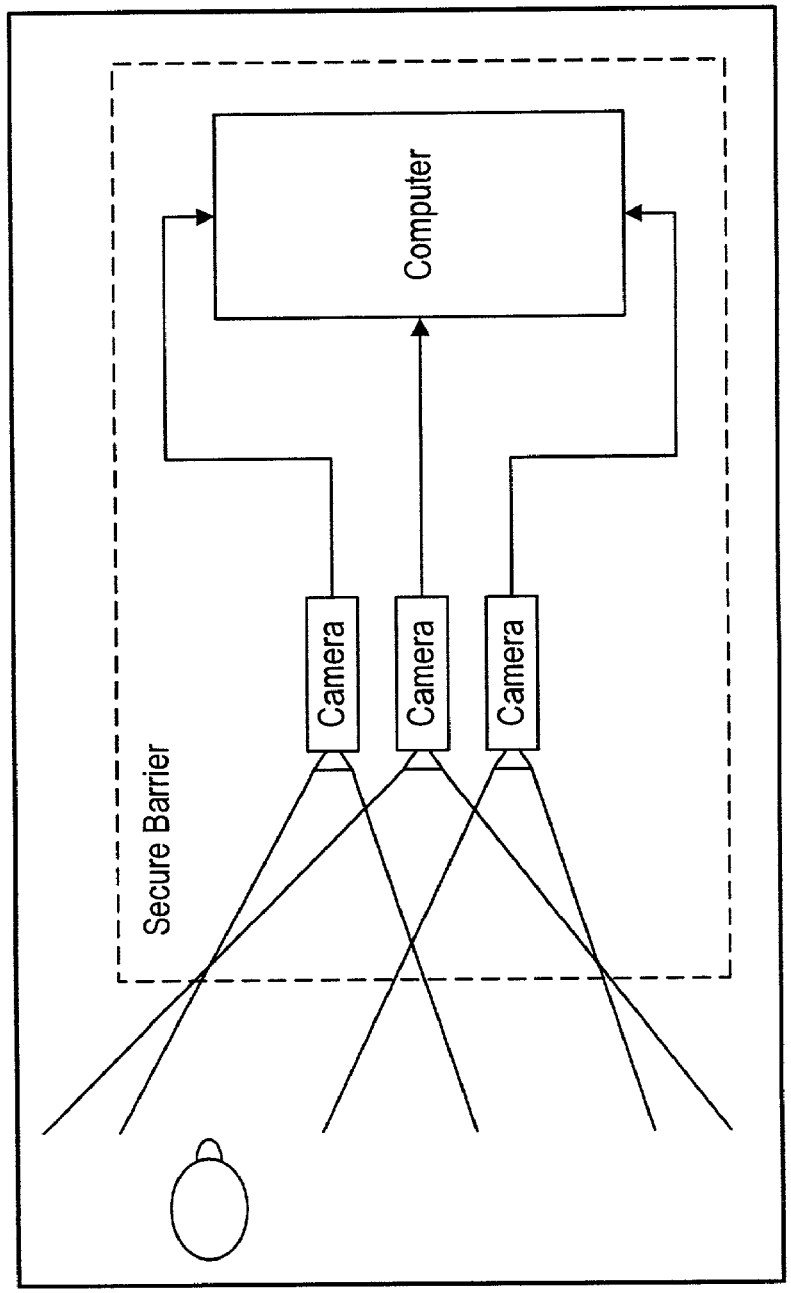
Figure 17:
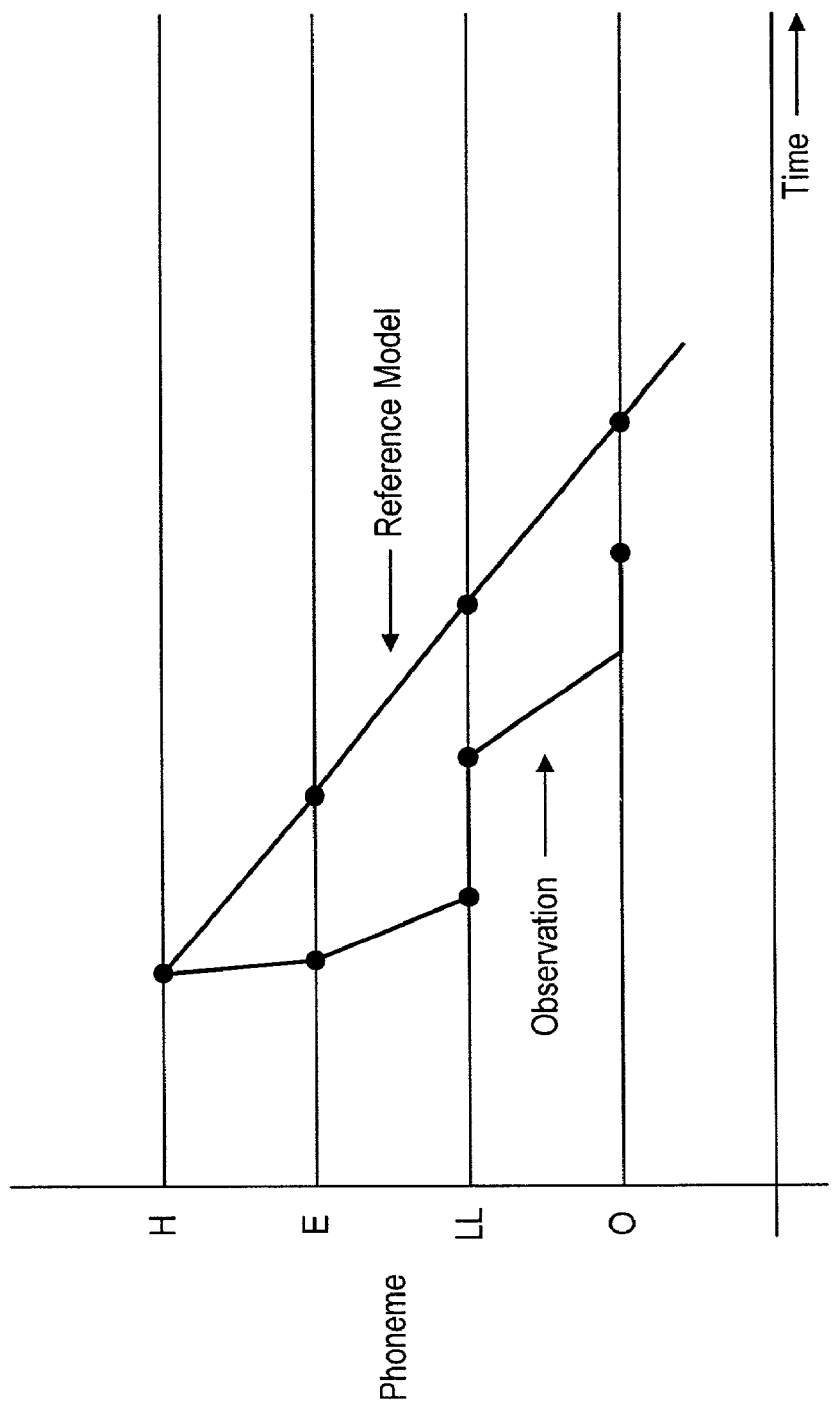

Every 16 milliseconds, the algorithm examines soundBuffer to search for vowel sounds. FIG. 15 shows the signal flow. First, the algorithm computes the Fast Fourier Transform (FFT) (Brigham, 1974) of the last 1028 samples. This instantaneous FFT is then used to compute the instantaneous power spectrum, which measures the power in each frequency band during the last 64 milliseconds.

Then to mimic the logarithmic response characteristics of human ears, the algorithm computes the logarithm of the power spectrum.

To eliminate background noises and microphone variations, the algorithm computes the running mean and standard deviation of the instantaneous power spectrum. These are used to normalize the instantaneous power spectrum by subtracting the mean and dividing by the standard deviation. Since the objective it to find vowel sounds, the next step is to look for peaks in the power spectrum. Vowel sounds are characterized by several, evenly-space narrow peaks in the instantaneous power spectrum. Therefore, the algorithm looks for relatively sharp peaks with distinct valleys in between. Broad peaks would correspond to broadband noise and are of no interest when looking for vowels. The locations (frequencies) of the peaks are stored in an array called instantaneousPeakFrequencies.

The algorithm is looking for a vowel sound that is sustained over a significant period of time. Therefore, it keeps track of the duration of frequency peaks in an array of data structures called lines. Each line data structure has a frequency history and a duration. If the frequency of an instantaneous peak is near to the last frequency of an existing line, the duration of the line is extended. A peak that is not near an existing line causes a new line to be added to the set. A line is dropped from the set if no peaks are near it for 640 milliseconds.

A key characteristic of a vowel sound is that there are peaks at several, evenly-spaced frequencies. This characteristic is called bandedness. The spacing between the peaks of a banded sound is called the pitch of the sound. The algorithm evaluates the bandedness of the sound by scanning through the possible pitches and counting the number of the peaks that are evenly spaced with each pitch. The maximum number of peaks is the bandedness score. The probability that a sound is a vowel is calculated by the length of the lines and the number of frequency bands in the sound. The longer the lines and the more bands that a sound has, the more likely it is to be a vowel.

Tactile Detection

Tactile detection means simply that the algorithm senses when one of the computer's input devices has been touched by the user. For the Microsoft Windows operating system, the algorithm uses a standard procedure to register for notification of keyboard and mouse activity.

If the user types on the keyboard or moves the mouse, the algorithm assumes the presence probability is 100 percent. This probability decays with time. Typically, an exponential decay is used, and the decay constant is set so that the presence probability is only 10 percent after 10 seconds. However, this constant can be adjusted to match the needs of particular applications.

B) REMOTE NOTIFICATION OF AVAILABILITY BASED ON SENSED PRESENCE AND ACTIVITY STATE

One use of user presence and activity information is to provide information about whether the user is available for communication. Before initiating a video or audio call, a remote user can query the presence and activity status of the person with whom they wish to communicate. If the user is not present at their workstation or in their office, or is present but is already on another call, there may be no need to attempt the call.

The desired communication can be electronic, as in the above example, or it can be "face-to-face". In this case, the remote user queries the person they wish to communicate with, before deciding to walk to that person's office.

C) AUTOMATICALLY SCHEDULING A CONFERENCE CALL, BASED ON SENSED PRESENCE AND ACTIVITY

A second application of user presence and activity information is to schedule a conference call with two or more participants.

A software program, which we call the "Connection Agent," utilizes information from multiple presence and activity sensors in different physical locations. The Connection Agent is provided with a list of desired participants for a virtual meeting or conference call, and that agent monitors the presence and activity information for each participant. When all desired participants are available, the Connection Agent notifies the meeting organizer that the conference should begin, and/or initiates the multi-way communication stream automatically.

D) NOTIFICATION OF AN INCOMING CALL, BASED ON SENSED PRESENCE AND ACTIVITY STATE

A final use of user presence and activity state information is the discrete notification to the user of incoming messages, such as telephone calls, emails, and videoconference requests. A call receiving agent can use information about the user presence and activity state to modulate how a user is notified about an incoming call.

It may be advantageous to use different protocols for incoming call notification based on the activity state of the user. In general, the user should be able to "script" or specify to the system, either directly or indirectly, how messages of various types and priority should be announced. The user can condition the announcement parameters on the presence and activity state information, in addition to message priority, sender, and other typical message filtering attributes.

A typical protocol might be:
1. When the user is working at the computer, display a message on the computer screen regarding the incoming call.
2. If the user is not present in the office, transfer the call to a message taking service.
3. When the user is meeting with other people in the office, delay notification until the meeting has finished, unless the message priority is marked high or is from someone the user reports to in the organization.
4. Otherwise, use an audible announcement to notify the user of the call.

When attempting to establish a connection which involves a video channel, it is desirable to allow the intended recipient of the call to see an image of the sender before deciding whether to accept the call. Accompanying the notification specified above, we send an image or a live video feed of the calling user. This "Video-Caller-Id" (or "Video-Knock") image may be adjusted according to the user state, for example, adjusting the size of the display.

Various changes and modifications are possible within the scope of the inventive concept, as will be apparent to those active in the video conferencing art. Therefore, the present invention is not limited to the embodiments described above, but rather is defined by the following claims.

REFERENCES CITED

S. Birchfield. "Elliptical head tracking using intensity gradients and color histograms," *Proceedings of the IEEE Conference on Computer Vision and Pattern Recognition,* Santa Barbara, 1998.

E. Oran Brigham, The Fast Fourier Transform, Prentice-Hall, Inc., Englewood Cliffs, N.J., 1974.

Grimson, W. E. L., Stauffer, C., Romano, R., Lee, L. "Using adaptive tracking to classify and monitor activities in a site", *Proceedings of the IEEE Conference on Computer Vision and Pattern Recognition,* Santa Barbara, 1998.

Robert M. Haralick and Linda G. Shapiro, *Computer and Robot Vision, Volume II,* Addison-Wesley Publishing Company, Inc., Reading, Mass., 1993.

Ramesh Jain, Rangachar Kasturi, and Brian G. Schunck, *Machine Vision,* McGraw-Hill, Inc., New York, N.Y., 1995.

Phillip E. Mattison, Practical Digital Video with Programming Examples in C, John Wiley & Sons, Inc., New York, N.Y., 1994.

N. Oliver, A. Pentland, F. Berard, "LAFTER: Lips and face real time tracker," *Proceedings of the IEEE Conference on Computer Vision and Pattern Recognition,* 1997.

Walter Oney, Programming the Microsoft Windows Driver Model, Microsoft Press, Redmond, Wash., 1999.

Y. Raja, S. J. McKenna, S. Gong, "Tracking and segmenting people in varying lighting conditions using colour." *Proceedings of the Int. Conference on Automatic Face and Gesture Recognition,* 1998.

H. Rowley, S. Baluja, and T. Kanade, "Rotation-Invariant Neural Network-Based Face Detection," in *Proceedings of the IEEE Conference on Computer Vision and Pattern Recognition,* June, 1998.

Tom Rikert and Mike Jones and Paul Viola, "A Cluster-Based Statistical Model for Object Detection," *Proceedings of the International Conference on Computer Vision,* 1999.

John C. Russ, *The Image Processing Handbook, Second Edition,* CRC Press, Boca Raton, Fla., 1995.

Schrier, E., and Slaney, M. "Construction and Evaluation of a Robust Multifeature Speech/Music Discriminator", Proc. 1997 Intl. Conf. on Computer Vision, Workshop on Integrating Speech and Image Understanding, Corfu, Greece, 1999.

K.-K. Sung and T. Poggio, "Example-based Learning for View-based Human Face Detection" AI Memo 1521/CBCL Paper 112, Massachusetts Institute of Technology, Cambridge, Mass., December 1994.

C. Wren, A. Azarbayejani, T. Darrell, and A. Pentland, "Pfinder: Real-time tracking of the human body", *IEEE Transactions on Patterns and Machine Intelligence (PAMI)* 19(7): 780–785, July 1997.

What is claimed is:

1. A method of determining when to establish a communications link among multiple individuals by automatically determining each individual's availability, comprising the steps of:

determining a priority level of a requested communications link;

determining whether each individual is present near a communications device;

determining whether each individual is available, namely in an activity state which permits interruption because that activity state has a priority level no greater than the priority level of said requested communications link; and if each individual is both present and available, initiating said communications link among said individuals.

2. A method of determining when to establish a communications link among multiple individuals by automatically determining each individual's availability, comprising the steps of:

determining a priority level of a requested communications link;

determining whether each individual is present near a communications device;

determining whether each individual is available, namely in an activity state which permits interruption because that activity state has a priority level no greater than the priority level of said requested communications link; and if a predetermined quorum of desired participants are present and available, generating an indication that a communications link can begin.

* * * * *